United States Patent [19]

Sen

[11] Patent Number: 4,819,805

[45] Date of Patent: Apr. 11, 1989

[54] DECORATIVE WOODEN WATER-BIRD

[76] Inventor: Un-Chen Sen, No.52-2, Chi Tzu Rd., Hsiao I Li, Hou Lung Jenn, Miaoli Hsien, Taiwan

[21] Appl. No.: 121,221

[22] Filed: Nov. 16, 1987

[51] Int. Cl.$^4$ .............................................. A47G 29/00
[52] U.S. Cl. ...................................... 206/457; 217/7; 312/289; 312/333; D3/66; D3/75; D9/317
[58] Field of Search ................ 43/2, 3, 54.1; D7/5; D9/317; D3/66, 75; 217/7, 65; 312/285, 289, 333; 206/457, 1.5

[56] References Cited

U.S. PATENT DOCUMENTS

| | | | |
|---|---|---|---|
| D. 122,715 | 9/1940 | Stavenhagen | D7/5 |
| D. 151,115 | 9/1948 | Zipser | D7/5 |
| 1,014,831 | 1/1912 | Long | 217/7 |
| 1,604,615 | 10/1926 | Stoner | 43/3 |
| 2,615,776 | 10/1952 | Lorentzen | 312/289 |
| 2,706,357 | 4/1955 | Nigh et al. | 43/3 |
| 3,538,724 | 11/1970 | Dauenbaugh | 312/333 |
| 4,356,928 | 11/1982 | Stafford | 206/457 |
| 4,370,007 | 1/1983 | Fler | 312/333 |

FOREIGN PATENT DOCUMENTS 454571 2/1949 Canada ................................. 150/110

OTHER PUBLICATIONS

"Duck Cigarette Box", on p. 23 of Friendly Pine Yield House (1966).
"Mallard Duck", on p. 155 of Evans 1983-84 catalog, Designs.

Primary Examiner—Stephen Marcus
Assistant Examiner—Gary E. Elkins
Attorney, Agent, or Firm—Fitch, Even, Tabin & Flannery

[57] ABSTRACT

A wooden water-bird having a plurality of compartments for receiving small articles such as coins, jewellery and other decorative articles. The compartments are slidable along a guideway formed within the interior of the wooden water-bird. A lock is disposed at one lateral face defining the tail section of the wooden water-bird.

1 Claim, 2 Drawing Sheets

DECORATIVE WOODEN WATER-BIRD

BACKGROUND OF THE INVENTION

The present invention relates to a wooden water-bird, and more particularly relates to a wooden water-bird having a plurality of compartments on the inside thereof for keeping small articles such as decorative articles, coins, jewels, etc.

Conventional wooden water-bird provides only decorative applications and is made without considering other possible usages.

It is the purpose of this present invention, therefore, to mitigate and/or obviate the above-mentioned drawback in the manner set forth in the detailed description of the preferred embodiment.

SUMMARY OF THE INVENTION

A primary objective of this invention is to provide a decorative wooden water-bird which can be used as a decorative piece and a handicraft.

Another objective of this invention is to provide a decorative wooden water-bird having a plurality of compartments for the storing of small articles or jewels etc.

Another objective of this invention is to provide a decorative wooden water-bird which can be easily manufactured.

Further objectives and advantages of the present invention will become apparent as the following description proceeds, and the features of novelty which characterize the invention are pointed out with particularity in the claims annexed to and forming a part of this invention.

DESCRIPTION OF THE PREFERRED EMBODIMENT

The drawings illustrate a decorative wooden water-bird (90) which is a preferred embodiment of this invention. Decorative wooden water-bird (90) comprises essentially a duck-shaped housing (1) having at least three walls and a plurality of compartments (2, 3, 4) illustrated best in FIG. 2.

Figure 1:
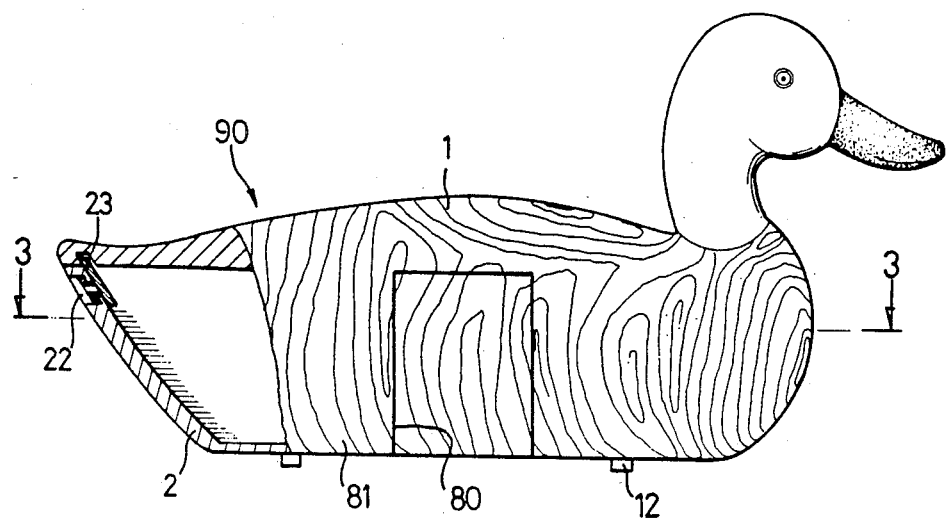
FIG. 1 is a cross-sectional view of a decorative wooden water-bird in accordance with the present invention.

Referring to FIG. 1, a cross-sectional view of a decorative wooden water-bird (90) is illustrated. It can be seen that a first compartment (2) with a lock (23) is received in an aperture (11) in a first wall (25) along the axis of the duck-shaped housing (1) to define the tail section of a decorative wooden water-bird (90). The lock (23) is locked or unlocked at a circular opening (22) corresponding to the position of said lock (23) in the first wall (25). The lock (23) allows the first compartment (2) to be locked to the housing (1). Two parallel rods (12) are provided at the base of the housing (1) for supporting the figure.

Figure 3:
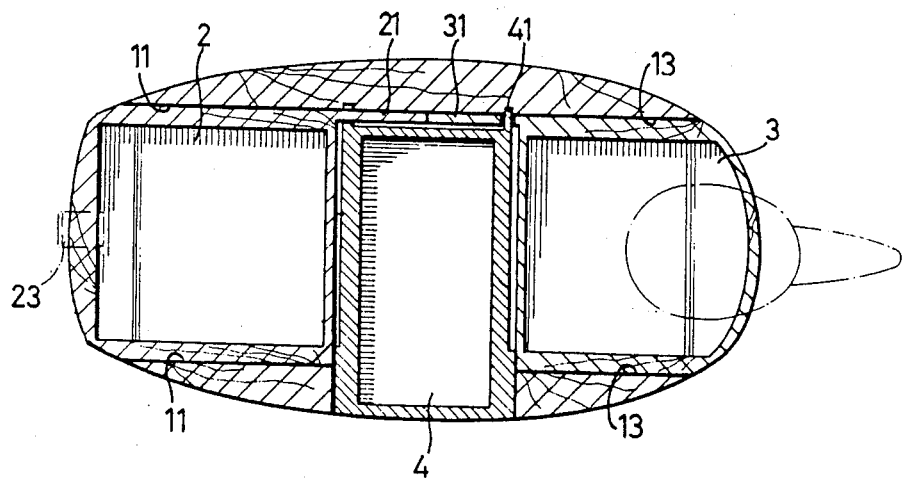
FIG. 3 is a top elevational view of a decorative wooden water-bird in accordance with the present invention.
Figure 2:
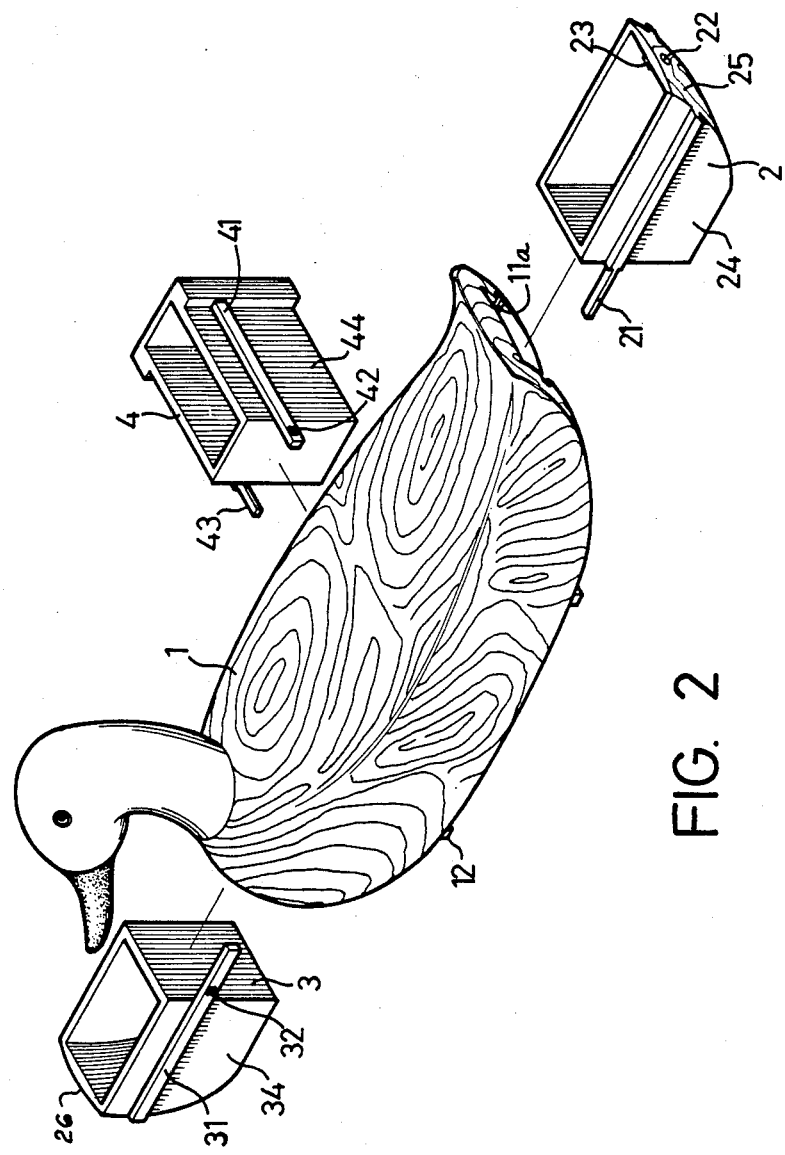
FIG. 2 is a perspective view in accordance with the present invention showing a plurality of compartments withdrawn from the wooden waterbird housing.

Referring to FIGS. 2 and 3, within the housing (1) of the wooden water-bird (90), a plurality of compartments (2, 3, 4) can be seen to be arranged in such a way that a second compartment (3) is slidably received in an aperture (13) in a second wall (26) which is opposite the first wall (25). An opening (80) adapted to a third compartment (4) is provided at third wall (81) of the housing (1), which is adjacent both the first and second walls (25,26) such that said third compartment (4) can be slid into the housing (1).

Again referring to FIG. 2, the first compartment (2) has a first element (21) laterally attached to a lateral wall (24) and protruding therefrom. The second compartment (3) has a second element (31) laterally attached to a lateral wall (34) and extending therefrom, which is aligned to the first element (21) of the first compartment (2). The third compartment (4) has another first and second elements (43,42), each laterally attached to and protruding therefrom, wherein the second element (42) is provided on a lateral wall (44) of the third compartment (4) agjacent the first compartment (2) and the first element (43) is provided on another lateral wall adjacent the second compartment (3). Each of the second elements has a bore therein adapted to receive respectively a first element from another of the compartments. For example, the second element (31) has a bore (32) therein and another second element (41) has a bore (42).

Apertures (11), (13) are each provided with a horizontal guideway (11a) within said housing (1), such that the first element (21) of the first compartment (2) and the second element (31) of the second compartment (3) are slidably moved along the guideways (11), (13).

Referring again to FIGS. 2 and 3, the second compartment (3) is first slid into the housing (1) along the guideway 11a. Next the third compartment (4) slides in perpendicular to the direction of the guideway 11a such that said first element (43) of the third compartment (4) is inserted into said bore (32) of the second element (31) of the second compartment (3). Further, the first compartment (2) is slid into the housing along said guideway 11a in such a way that said first element (21) of the first compartment (2) is inserted into said bore (42) of the second element (41) of the third compartment (4). According to such procedure, the plurality of compartments (2), (3), (4) are secured to the housing (1) when the hook (23) is locked to said housing (1).

When the compartments (2), (3), (4) are to be withdrawn from the housing (1), compartment (2) is first unlocked and slid out from said housing (1), next said third compartment (4) is withdrawn from the housing (1) through opening (80). Second compartment (3) is the last among the three compartments (2), (3), (4) to be withdrawn.

As various possible embodiments might be made of the above invention without departing from the scope of the invention, it is to be understood that all matter herein described or shown in the accompanying drawings is to be interpreted as illustrative and not in a limiting sense. Thus, it will be appreciated that the drawings are exemplary of a preferred embodiment of the invention.

I claim:

1. A decorative water bird comprising a duck-shaped housing having at least three walls; a first compartment slidably received in an aperture in said first wall, a second compartment slidably received in an aperture in said second wall opposite said first wall, and a third compartment slidably received in an opening on said third wall adjacent to said first and second walls;

the first compartment having a lock in one wall thereof and a first element attached thereto and protruding therefrom;

the second compartment having a second element attached thereto and extending therefrom;

the third compartment having another first element and another second element, each attached to and protruding from said third compartment; each of said second elements having a bore therein;

the compartments and protruding elements being oriented such that each said bore will receive one of said first elements whereby the second and third compartments may be locked within said housing by said first compartment.

* * * * *

UNITED STATES PATENT AND TRADEMARK OFFICE
CERTIFICATE OF CORRECTION

PATENT NO. : 4,819,805
DATED : April 11, 1989
INVENTOR(S) : Un-Chen Sen

It is certified that error appears in the above-identified patent and that said Letters Patent is hereby corrected as shown below:

Column 1, line 21, change "decorative" to --decoration--.

Column 1, line 42, change "waterbird" to --water-bird--.

Column 2, line 19, change "agjacent" to --adjacent--.

Column 2, line 32, change "guideways (11), (13)" to --guideway 11a--.

Signed and Sealed this

Third Day of July, 1990

Attest:

HARRY F. MANBECK, JR.

*Attesting Officer*    *Commissioner of Patents and Trademarks*